(No Model.)
W. C. MARSHALL.
ENVELOPE FOR CURED MEATS.
No. 436,287.  Patented Sept. 9, 1890.
*Fig. I.*
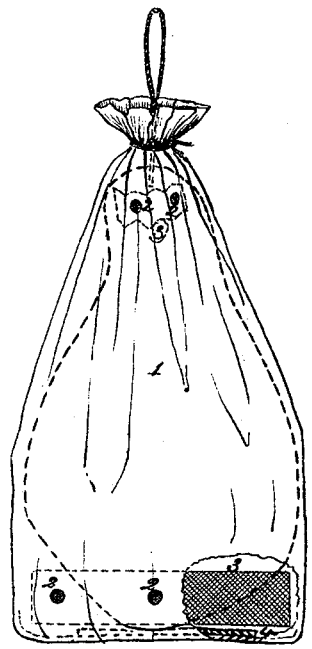
*Fig. III.*  *Fig. II.*  *Fig. IV.*
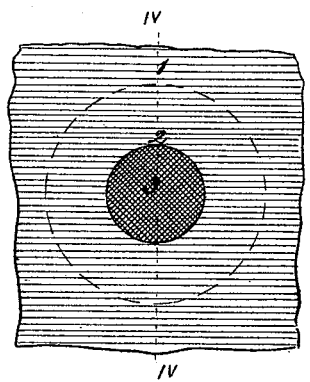 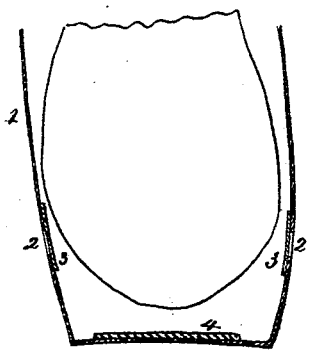 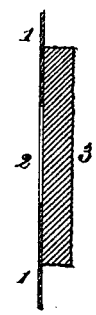
Attest:
E. Arthur
S. H. Knight
Inventor:
William C. Marshall
By Knight Bros.
Attys.

UNITED STATES PATENT OFFICE.

WILLIAM C. MARSHALL, OF ST. LOUIS, MISSOURI, ASSIGNOR OF ONE-FOURTH TO HENRY V. LANG, OF SAME PLACE.

ENVELOPE FOR CURED MEATS.

SPECIFICATION forming part of Letters Patent No. 436,287, dated September 9, 1890.

Application filed October 25, 1889. Serial No. 328,123. (No model.)

*To all whom it may concern:*

Be it known that I, WILLIAM C. MARSHALL, a citizen of the United States, residing at St. Louis, in the State of Missouri, have invented a Ventilated Insect-Proof Bag for Covering Smoked Meats.

In order to protect hams and other smoked meats from the attacks of insects the customary practice is to envelope them in a close-fitting air-tight bag or cover. Circulation of the air being thus prevented, there is no escape for the surplus moisture or water of the meat, and the bagging is kept in a moist state, which engenders what is known as "mold." Thus a piece of fresh smoked meat placed in an ordinary bag or cover will, in the short space of sixty hours, on being examined, show a deposit of mold on its surface. This mold, under certain conditions of temperature common to hot climates, "ferments," and the meat, absorbing the destructive atmosphere of the air-tight bag or cover, is in effect rendered worthless for human food, and immense loss results therefrom. It will be apparent that the mere dipping of the meat in an antiseptic solution, or making a surface application of such solution to the meat, is ineffective to prevent this molding action when it is remembered that all meat during the smoking process becomes highly impregnated with pyroligneous acid from the smoke, and such smoked meats are the very ones which are subject to the molding which it is the design of the present invention to prevent. The remedy lies in providing for a free ventilation and circulation of air around the meat, such means being adopted to accomplish this result, however, as will maintain the insect-proof character of the covering.

To this end my invention consists, essentially, of a covering or bag for the meat composed of a material—such as paper—whose texture is very compact or close, so that its mechanical formation alone will be impervious to or proof against the inroads of the larvæ, such bag being provided with a ventilator or ventilators whose mechanical structure or formation also is such as will prevent the inroads of the larvæ, but will admit of the passage of air and will allow the moisture arising from the meat to escape. As the larvæ themselves are so minute, they can work their way through the mesh of an ordinary fabric and drop down upon the meat, and indeed this is the case even when such fabric is impregnated with pyroligneous acid, for it is a noted fact that smoked meat is attacked by the skipper notwithstanding that it becomes highly permeated with this acid in the smoking process. It is very evident, therefore, that the acid alone does not afford a sufficient safeguard, and hence to provide a porous barrier that will keep out the larvæ and permit of the passage of air I employ a ventilator whose pores or air-passages are circuitous or undefined, so that the larvæ will be unable to work its way through them, and a material more nearly possessing this character is felt, which I prefer to use for this purpose.

In the accompanying drawings, illustrating my invention, Figure I is a side elevation of my improved bag or cover. Fig. II is a vertical sectional view of the lower part thereof, showing a portion of a piece of ham suspended therein. Fig. III is an enlarged detail view of one of the orifices with its covering of porous material. Fig. IV is a cross-section on the line IV IV, Fig. III.

The bag 1, preferably composed of stout paper, is provided with a number of apertures 2, preferably near both the top and bottom thereof, which serve to insure a free circulation of air through the bag and around the meat suspended therein, carrying away noxious gases and preventing molding or heating. The bag is made sufficiently large to allow a free circulation of the air around the meat.

In order to charge the air in the bag with antiseptic gases and to exclude all organic germs, I impregnate the substance of the bag with pyroligneous acid, or close the orifices 2 with a strip or sheet of porous material 3 impregnated with pyroligneous acid. In this latter case the body of the bag does not require the said impregnation, as all air entering the same would be through the orifices 2, and would consequently become charged with the acid in passing through the porous material 3.

The porous material I prefer to make of felt, but do not confine myself to this or to any particular material or class of materials for the desired purpose.

I have shown the porous material 3 upon the inner side of the bag. It may, however, be upon the outer side, if desired.

In addition to the lining sheet or strip 3 an additional piece or pieces 4, of porous material impregnated with pyroligneous acid, may be inserted within the bag, or the strip or sheet 3 may be dispensed with and the piece or pieces 4 relied upon for the impregnation of the air within the bag.

I claim as my invention—

1. A bag for meat, composed of paper and having air-holes therein and porous ventilators secured over said air-holes, substantially as set forth.

2. An impervious bag for meat, having porous ventilators therein at top and bottom, substantially as and for the purposes set forth.

3. A bag for meat, composed of paper and having air-holes therein and ventilators composed of felt secured over and covering said holes, substantially as and for the purposes set forth.

4. A bag or cover for meat, composed of a substance whose texture is compact or close and proof against the inroads of the larvæ by reason of its closeness, said bag having a porous ventilator—such as felt—whose pores or air-passages are circuitous, substantially as described, and for the purposes set forth.

5. An impervious bag for meat, having air-holes therein, said air-holes being covered by porous ventilators whose pores or air-passages are circuitous and irregular, said ventilator being adapted to be impregnated with pyroligneous acid, substantially as and for the purposes set forth.

WILLIAM C. MARSHALL.

In presence of—
THOMAS KNIGHT,
SAML. KNIGHT.